Sept. 3, 1940.  A. S. VAN HALTEREN ET AL  2,213,829
METHOD OF MAKING BRAKE DRUMS
Filed Aug. 20, 1938
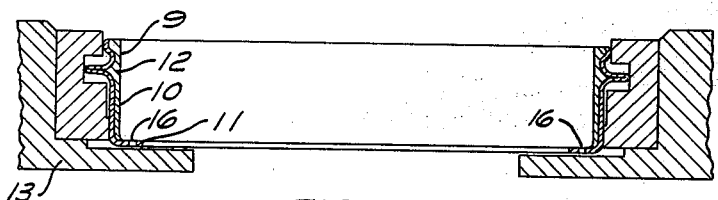
FIG. 1
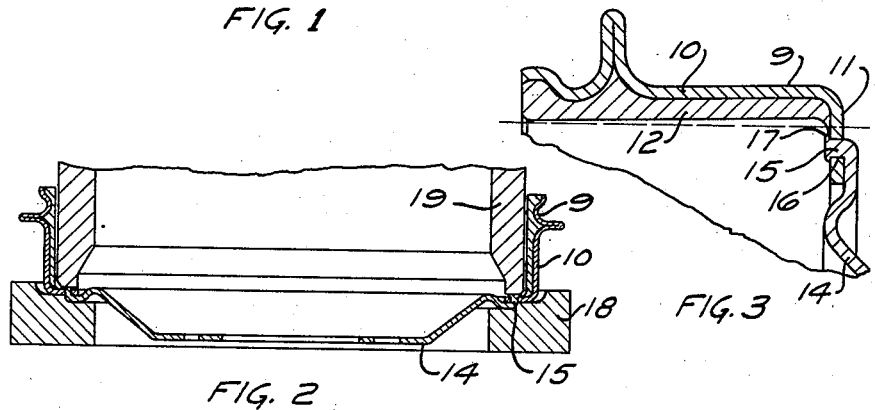
FIG. 2
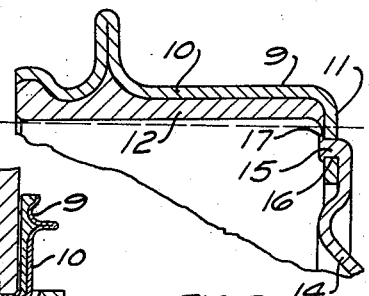
FIG. 3
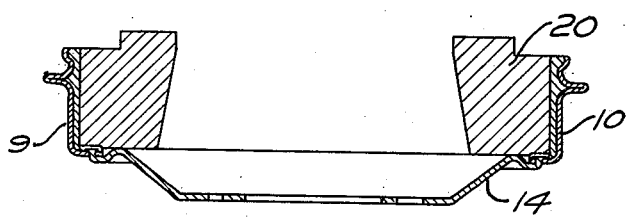
FIG. 4
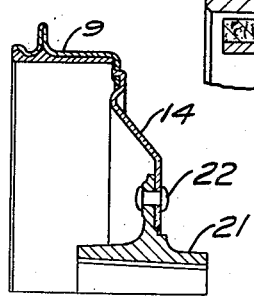
FIG. 7
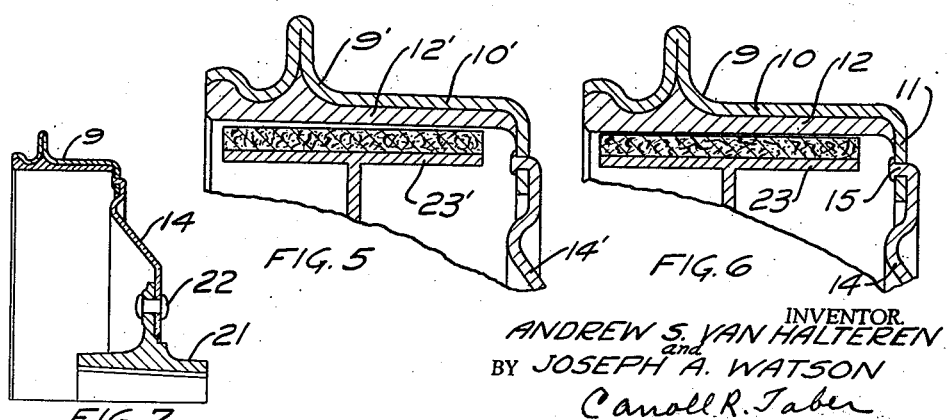
FIG. 5  FIG. 6
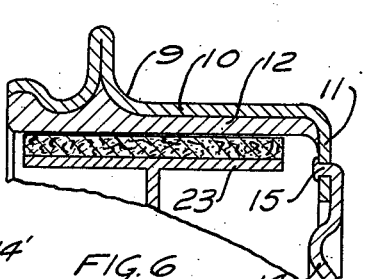
INVENTOR.
ANDREW S. VAN HALTEREN
and
BY JOSEPH A. WATSON
Carroll R. Taber
ATTORNEY.

Patented Sept. 3, 1940

2,213,829

UNITED STATES PATENT OFFICE 2,213,829

METHOD OF MAKING BRAKE DRUMS

Andrew S. Van Halteren and Joseph A. Watson, Lansing, Mich., assignors to Motor Wheel Corporation, Lansing, Mich., a corporation of Michigan Application August 20, 1938, Serial No. 225,848

7 Claims. (Cl. 29—152.2)

This invention relates to brake drums, and more particularly to a novel method of manufacturing the same.

When brake drums are put into service on vehicle wheels and subjected to the action of the brake shoes they invariably change in circumference. This change in circumference ordinarily is essentially an increase throughout the width of the brake ring, but it may, in certain types of brake drums, comprise a slight contraction at one end and a relatively large expansion at the opposite end. Such change in circumference has two major causes. One cause is the great increase in temperature generated by friction between the brake shoes and the brake ring when the brakes are applied. The other is mechanical stretch due to the radially outwardly directed pressure applied by the brake shoes. If the change in circumference is uniform across the entire axial width of the brake ring, and is also maintained within reasonable limits, no deleterious effects are experienced. Heretofore, however, most if not all brake drums did not change uniformly in circumference across their widths, but instead became considerably larger at their open ends than at their closed ends. In other words, they were subject to what is commonly known as bellmouthing. Furthermore, these brake drums did not return to their original dimensions after cooling but retained a permanent set. Under such conditions it became impossible for the brake shoes to exert a uniform pressure on the brake ring, thereby requiring higher pedal pressures to stop the vehicle and increasing the wear on the drums and shoes.

It has been determined that the greater part of the unequal change in brake ring circumference is due to the different resistances to stretch in different portions of the brake ring, and that these differences in resistances in turn are due to unequal internal stresses within the brake ring. Such internal stresses rise from a variety of causes, but probably the chief causes lie in the methods of manufacture.

In the manufacture of brake drums of the type herein disclosed, the riveting of the back or web of the brake drum to the brake ring stretches the edge of the ring to which the back is attached in a radially outward direction, so that the circumference of the interior surface of the ring at the attached edge is larger than that at the open edge thereof. At the same time, internal stresses are created within the brake ring which result in the above described unequal deformation, or change in circumference, of the brake ring in use.

In order to obtain the best operation from a brake ring in use, all internal stresses which tend to cause the ring to deform unequally should be eliminated and the interior surface of the ring should be truly cylindrical in so far as possible. Also the cross section of the brake ring should be uniform throughout its periphery.

Prior to the present invention, the interior surface of brake rings of the character here under consideration has been machined after the back has been attached, to bring such surface back to a cylindrical form. This machining operation had the disadvantage of causing the cross section of the brake ring to vary at different points about its periphery. Furthermore nothing has been done in the past to eliminate the internal stresses mentioned above.

According to the present invention, the internal stresses are eliminated and the ring is brought into cylindrical form, after the back has been attached, by expanding the open edge of the ring. This expanding operation eliminates the necessity for the rough machining operation heretofore required. This results in a saving of material previously lost by the machinery operation and also the elimination of the non uniform cross section thruout the circumference of the ring. The latter in turn eliminates to a large extent the problem of balancing the completed drum.

According the present invention resides in a method of manufacturing brake drums wherein after all other operations which distort the brake ring have been performed, the brake ring is stretched sufficiently to render the interior surface cylindrical and to remove any inherent tendency for it to stretch unequally when in use.

In the drawing:

Figure 1 is a fragmentary cross-sectional view of a brake ring in the die which is used in contracting and upsetting the ring;

Figure 2 is a fragmentary cross-sectional view of a brake drum during the operation of riveting the back to the brake ring;

Figure 3 is a fragmentary cross-sectional view of a drum showing its shape after the operation of Figure 2, with the deformation of the drum considerably exaggerated;

Figure 4 is a fragmentary cross-sectional view showing the drum in the expanding die during the expanding process which renders the inner surface of the brake drum cylindrical;

Figure 5 is a cross-sectional view of a conventional drum manufactured by ordinary processes showing the results of unequal expansion in use;

Figure 6 is a fragmentary sectional view of a brake drum manufactured by the process of this invention wherein the equal expansion of the two edges is shown; and Figure 7 is a cross-sectional view of a complete hub and drum assembly.

The method of making drums which embodies the present invention is shown as applied to a composite iron and steel brake drum, but the invention is not limited to the method of making that type of drum.

The brake drum consists of a brake ring 9 and a back 14. The brake ring comprises a pressed steel shell 10 having a radial flange 11 at one edge. Around the flange 11 are a plurality of circumferentially spaced holes, the purpose of which will appear presently. The shell 10 is lined with iron, which is preferably centrifugally cast therein. The process of forming such a brake ring is well known, and need not be described here.

The brake ring is placed in a die 13, a portion of which is shown in Figure 1 and the brake ring is contracted and upset slightly. This operation makes the outer surface of the ring round and brings it to the desired outer dimensions.

The interior surface of the brake ring 9 is then rough turned to cylindrical form whereby the interior surface is brought to the desired dimension.

It should be pointed out here that the dimensions of the ring at this point in the process are not final dimensions. The internal diameter of the ring at the completion of the last mentioned operation must be smaller than the desired final internal diameter, because of the subsequent steps which increase the size of the ring.

A drum back 14 having a plurality of integral fingers 15 extending laterally thereof is then placed on the edge of the drum, with the fingers 15 extending through the complementary apertures 16 in the radial flange 11 of the brake ring. The back 14 and brake ring 9 are then placed in proper position on an anvil 18 of a press and the ends of the fingers 15 are riveted over, as at 17, by means of the plunger 19 of the press. During this operation the metal of the fingers 15 is caused to flow radially of the drum, completely filling the openings 16 in the flange. At the same time there is a tendency for the fingers 15 to flatten in an axial direction and bend slightly radially, and thereby expand the end of the brake ring to which the back 14 is attached. The result of this expansion is shown in Figure 3 on an exaggerated scale, the dotted line showing positions of the internal surface of the brake drum before the back is riveted on. It will be apparent that the diameter of the brake ring at the closed end is considerably larger than at the open end. This difference in diameter will often run as much as .03 of an inch.

At this point the usual process of manufacturing brake drums would be to machine the inner surface of the brake drum to cylindrical form. It will be readily apparent that due to the stretching of the anchored edge of the brake ring by the last mentioned step the internal stresses in the brake ring are not uniformly distributed. If such a drum is now placed in service and the brake shoes applied thereto there will be a tendency for the internal stresses to be equalized by greater stretching of the brake ring at the open end than at the closed end of the brake ring, and as a result, the brake drum will bell mouth.

This invention modifies the process by placing the brake drum in an expanding die 20, a portion of which is shown in Figure 4, and stretching the brake drum to a truly cylindrical shape. In this manner the internal diameters of the open and closed ends of the brake ring are made the same, and the internal stresses in the brake ring are equalized.

The brake drum is then secured by means of rivets 22 to a conventional hub 21. The hub is placed on an arbor (not shown), and the interior surface of the brake ring is then finish turned to make the interior surface cylindrical and concentric with the hub bearing.

The brake drum thus formed will not acquire a permanent distortion in service due to expansion caused by heat or brake shoe pressure but to the contrary, the drum braking surface will return to a true cylinder concentric with the hub bearings when the drum temperature returns to normal after a brake application, as shown in Figure 6.

The contrasting distortion of a drum made by previous processes is shown in Figure 5. This figure shows a brake drum 9' consisting of a steel shell 10', cast iron lining 12' and back 14'. To all outward appearance this drum is identical with the one previously described, but is not made by the same method. Here the brake shoe 23' is shown in its released condition, but the brake drum is shown in its stressed or expanded condition whereby the brake shoes and brake drum are not aligned with each other.

It will be apparent that the invention herein disclosed is a material improvement on previous processes of manufacturing brake drums, because the pressure of the brake shoes on the brake drums is equalized at all times and the drum will always remain a true cylinder even though it expands slightly.

The scope of the invention is indicated in the appended claims.

1. The method of making a brake drum of the type adapted for use with radially acting brake shoes which includes forming a brake ring having a cast metal braking surface, and after performing all other operations on said brake drum which tend to produce unequal internal stresses in said ring, straining the ring in a radial direction sufficiently to remove the inherent tendency to deform unequally under the action of the brake shoes in use.

2. The method of making a brake drum of the type adapted for use with radially acting brake shoes which includes forming a brake ring having a cast metal braking surface, securing a back to one edge thereof and thereby expanding said edge, and after performing all other operations on said brake drum which tend to produce unequal stresses in said ring, straining the ring in a radial direction sufficiently to remove the inherent tendency to deform unequally under the action of the brake shoes in use.

3. The method of making a brake drum which includes forming a brake ring having a cast metal braking surface, securing a back to one edge thereof and thereby expanding said edge, and subsequently stretching the brake ring sufficiently to render the internal surface thereof cylindrical.

4. The method of making a brake drum of the type adapted for use with radially acting brake shoes, which comprises forming a brake ring, and after performing all other operations on said drum which tend to produce unequal internal stresses in said ring, straining said ring in a radial direction sufficiently to remove the inherent tendency thereof to deform unequally under the action of the brake shoes in use.

5. The method of making a brake drum of the type adapted for use with radially acting brake shoes which comprises forming a brake ring, securing a back to one edge of the ring and thereby expanding said edge, and after performing all other operations on said drum which tend to produce unequal internal stresses in said ring, straining said ring in a radial direction sufficiently to remove the inherent tendency of the ring to deform unequally under the action of the brake shoes in use.

6. The method of making a brake drum of the type adapted for use with radially acting brake shoes which comprises forming a brake ring, contracting said ring radially to render it round, securing a back to one edge of the ring and thereby expanding said edge, and thereafter straining said ring in a radial direction sufficiently to remove the inherent tendency thereof to deform unequally under the action of the brake shoes in use.

7. The method of making brake drums of the type adapted for use with radially acting brake shoes which comprises forming a brake ring, contracting said ring radially to render it round, securing a back to one edge of the ring and thereby expanding said edge, and thereafter straining said ring in a radial direction sufficiently to remove the inherent tendency thereof to deform unequally under the action of the brake shoes in use, and finally machining the interior surface of the brake ring.

ANDREW S. VAN HALTEREN.
JOSEPH A. WATSON.